(12) United States Patent
Shankar et al.

(10) Patent No.: US 9,529,433 B2
(45) Date of Patent: Dec. 27, 2016

(54) FLEXIBLE SMART GLOVE

(71) Applicant: STMICROELECTRONICS PTE LTD, Singapore (SG)

(72) Inventors: Ravi Shankar, Singapore (SG); Olivier Leneel, Singapore (SG)

(73) Assignee: STMicroelectronics Pte Ltd, Singapore (SG)

( * ) Notice: Subject to any disclaimer, the term of this patent is extended or adjusted under 35 U.S.C. 154(b) by 42 days.

(21) Appl. No.: 14/586,547

(22) Filed: Dec. 30, 2014

(65) Prior Publication Data

US 2016/0187973 A1 Jun. 30, 2016

(51) Int. Cl.
*G06F 3/01* (2006.01)
*G09G 5/18* (2006.01)

(52) U.S. Cl.
CPC .............. *G06F 3/014* (2013.01); *G09G 5/18* (2013.01); *G09G 2370/16* (2013.01)

(58) Field of Classification Search
CPC ........................................................ G06F 3/014
See application file for complete search history.

(56) References Cited

U.S. PATENT DOCUMENTS

| | | | | |
|---|---|---|---|---|
| 4,746,894 A | * | 5/1988 | Zeldman | ................ H01C 10/08 338/114 |
| 5,610,528 A | * | 3/1997 | Neely | ................ A61B 5/1071 324/660 |
| 5,973,623 A | | 10/1999 | Gupta et al. | |
| 6,114,862 A | | 9/2000 | Tartagni et al. | |
| 6,225,711 B1 | | 5/2001 | Gupta et al. | |
| 6,512,381 B2 | | 1/2003 | Kramer | |

(Continued)

FOREIGN PATENT DOCUMENTS

| | | |
|---|---|---|
| EP | 0 929 050 A2 | 7/1999 |
| EP | 1 990 759 A2 | 11/2008 |

OTHER PUBLICATIONS

Fujitsu, "Fujitsu smart glove points to a good day at work," retrieved Dec. 9, 2014, URL=http://www.cnet.com/news/fujitsu-smart-glove-points-to-a-good-day-at-work/, 4 pgs.

(Continued)

*Primary Examiner* — Viet Pham
(74) *Attorney, Agent, or Firm* — Seed Intellectual Property Law Group LLP

(57) ABSTRACT

A flexible smart glove detects fine hand and finger motions while permitting the wearer to make hand gestures with dexterity. The flexible smart glove has a thickness of less than about 100 μm and incorporates capacitive microsensors positioned at finger joint locations. The microsensors are thin film devices built on substrates made of a pliable material such as polyimide. Interdigitated serpentine capacitors monitor strain in the back of the hand, while parallel plate capacitors monitor contact pressure on the palm. Thus the smart glove responds electrically to various types of hand motions. Thin film resistors responsive to changes in body temperature are also formed on the flexible substrate. Motion and temperature data is transmitted from the glove to a microprocessor via a passive RFID tag or an active wireless transmitter. An ASIC is embedded in the smart glove to relay real time sensor data to a remote processor.

20 Claims, 6 Drawing Sheets

(56) References Cited

U.S. PATENT DOCUMENTS

| 6,580,816 B2 | 6/2003 | Kramer et al. | |
|---|---|---|---|
| 2001/0025532 A1 | 10/2001 | Kramer | |
| 2006/0065048 A1* | 3/2006 | Brouillette | F01D 21/003 |
| | | | 73/112.01 |
| 2007/0069401 A1* | 3/2007 | Kakehata | C23C 8/36 |
| | | | 438/785 |
| 2011/0005090 A1* | 1/2011 | Lee | G01D 5/145 |
| | | | 33/1 PT |
| 2012/0069552 A1* | 3/2012 | Richter | F21V 33/0008 |
| | | | 362/103 |
| 2012/0157263 A1* | 6/2012 | Sivak | A61H 1/0285 |
| | | | 482/4 |
| 2014/0215684 A1* | 8/2014 | Hardy | A41D 19/0031 |
| | | | 2/160 |
| 2015/0130698 A1* | 5/2015 | Burgess | G06F 1/163 |
| | | | 345/156 |

OTHER PUBLICATIONS

ZJ-Weaver, "Augmented Hyper-Reality Glove," retrieved Dec. 9, 2014, URL=http://www.instructables.com/id/Augmented-Hyper-Reality-Glove/, 9 pgs.

Virtual Realities Ltd., "IGS Glove," retrieved Dec. 9, 2014, URL=http://www.vrealities.com/products/data-gloves/igs-glove, 4 pgs.

Adnan, et al., "The Development of a Low Cost Data Glove by Using Flexible Bend Sensor for Resistive Interfaces," The $2^{nd}$ International Malaysia-Ireland Joint Symposium on Engineering, Science and Business 2012, pp. 579-587.

LeNeel, "Flexible Electrochemical Micro-Sensor," U.S. Appl. No. 14/200,828, filed Mar. 7, 2014 (30 pgs.).

* cited by examiner

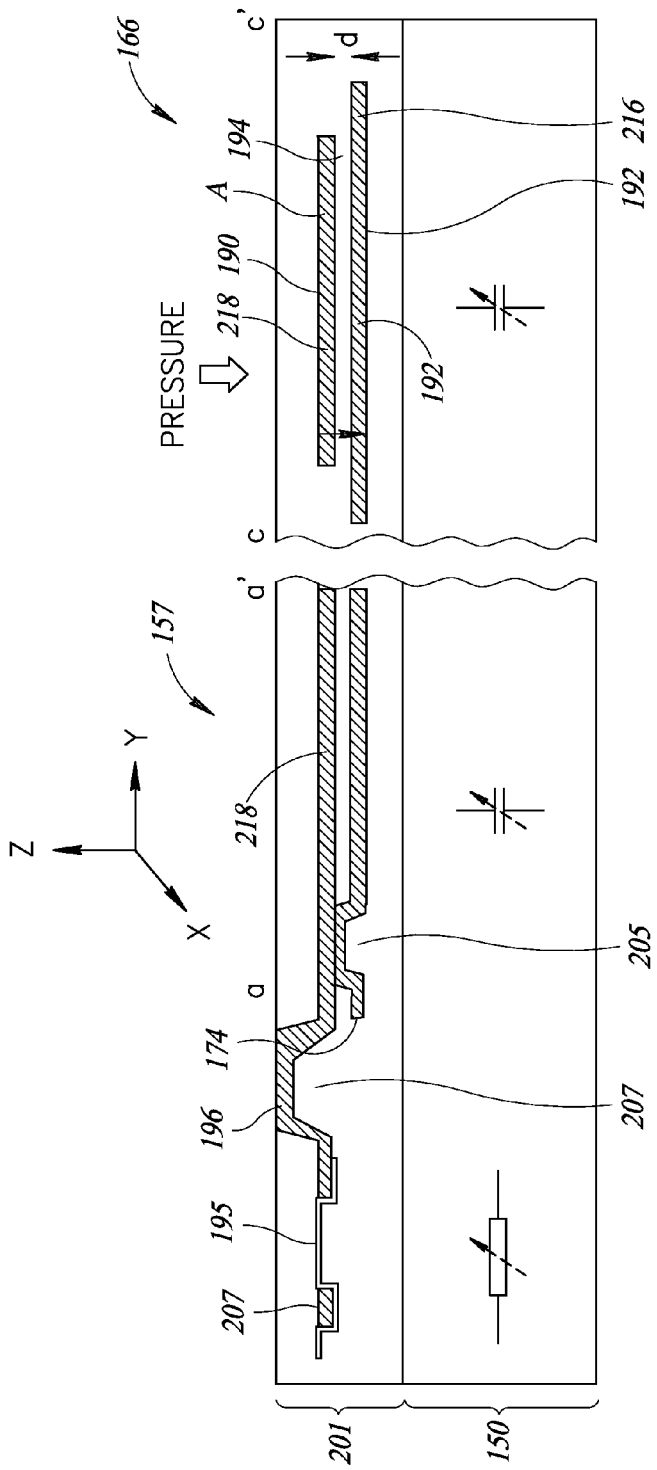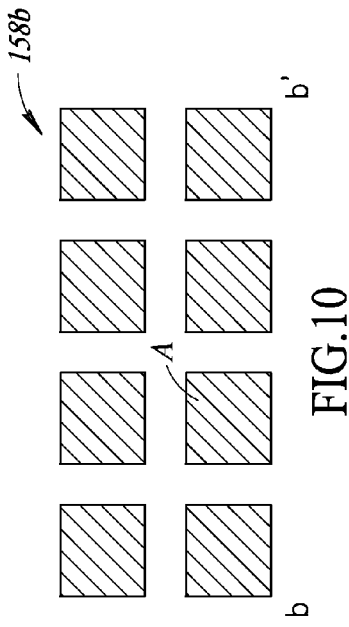

FLEXIBLE SMART GLOVE

BACKGROUND

Technical Field

The present disclosure generally relates to wearable technology and, in particular, to virtual reality gloves having embedded capacitive micro-sensors.

Description of the Related Art

Wearable electronic technology is currently a rapidly growing field. Examples of wearable technology include smart watches, continuous medical monitors, activity and fitness monitors, and clothing that incorporates environmental sensors. Techno-clothing includes virtual reality garments such as headgear featuring heads-up displays, computerized glasses, and wired smart gloves used for virtual reality gaming. Some commercially available smart gloves include motion sensors that incorporate optical input/output devices, micro-electromechanical system (MEMS) sensors, or miniature gyroscopes. However, commercially available smart gloves tend to be thick, bulky, and hard to take on and off a user's hand. Furthermore, because of the wide range of motion of the hand, durability and reliability are particularly challenging for designers of smart gloves.

BRIEF SUMMARY

A thin, flexible smart glove detects fine hand and finger motions while permitting the wearer to engage in hand gestures with unobstructed dexterity. The flexible smart glove incorporates capacitive micro-sensors positioned at locations in the glove that correspond to joints of the hand. The capacitive micro-sensors are thin film devices built on flexible substrates made of a pliable material such as polyimide. The flexible substrates allow the micro-sensors to bend without cracking in response to hand and finger motion. The capacitive micro-sensors consist of metal features separated by a polyimide dielectric material that is compressible. Different types of capacitive structures can be used to sense different parts of the hand. For example, interdigitated comb structures may be more effectively used to monitor flexion of the back of the hand. When a wearer flexes their hand joints, tension in the fingers will tend to stretch the elastic glove material causing the interdigitated combs to change shape or physical location with respect to each other, thereby affecting fringe capacitance between the metal strips of the combs. Meanwhile, parallel plate capacitors may be more effective in monitoring contact pressure from the palm side of the hand. Palm motions that exert pressure on capacitor plates will force the plates closer together. The displacement of the plates can be sensed as a change in capacitance. Thus the smart glove responds electrically to various hand motions. In addition, temperature micro-sensors in the form of metallic thin film resistors are responsive to environmental changes or changes in body temperature of the wearer.

Electrical signals generated by the micro-sensors are made available at contact pads to which connecting wires can be coupled to extract the sensor signals for transmission from the glove to a microprocessor located in a different part of the glove or external to the glove. Communication of the sensor data to a remote destination can be wireless. For example, an RFID tag can be used to accumulate and store the sensor data and surrender buffered data to an interrogating radio signal. Alternatively, an active wireless transmitter on board an application specific integrated circuit (ASIC) can be embedded in the smart glove to relay real time sensor data to a remote processor. A thin form factor allows the smart glove to be worn by a wide variety of users and in a wide range of situations.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

FIG. 9A is a cross-sectional view of the micro-sensors shown in FIG. 5, taken along cut line a-a'.

FIG. 9B is a cross-sectional view of the micro-sensors shown in FIG. 5, taken along cut line c-c'.

FIG. 10 is a cross-sectional view of the micro-sensors shown in FIG. 5, taken along cut lines b-b'.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of semiconductor fabrication comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Specific embodiments are described herein with reference to wearable flexible micro-sensors that have been designed and/or produced; however, the present disclosure and the reference to certain materials, dimensions, and the details and ordering of processing steps are exemplary and should not be limited to those shown.

Figure 1:
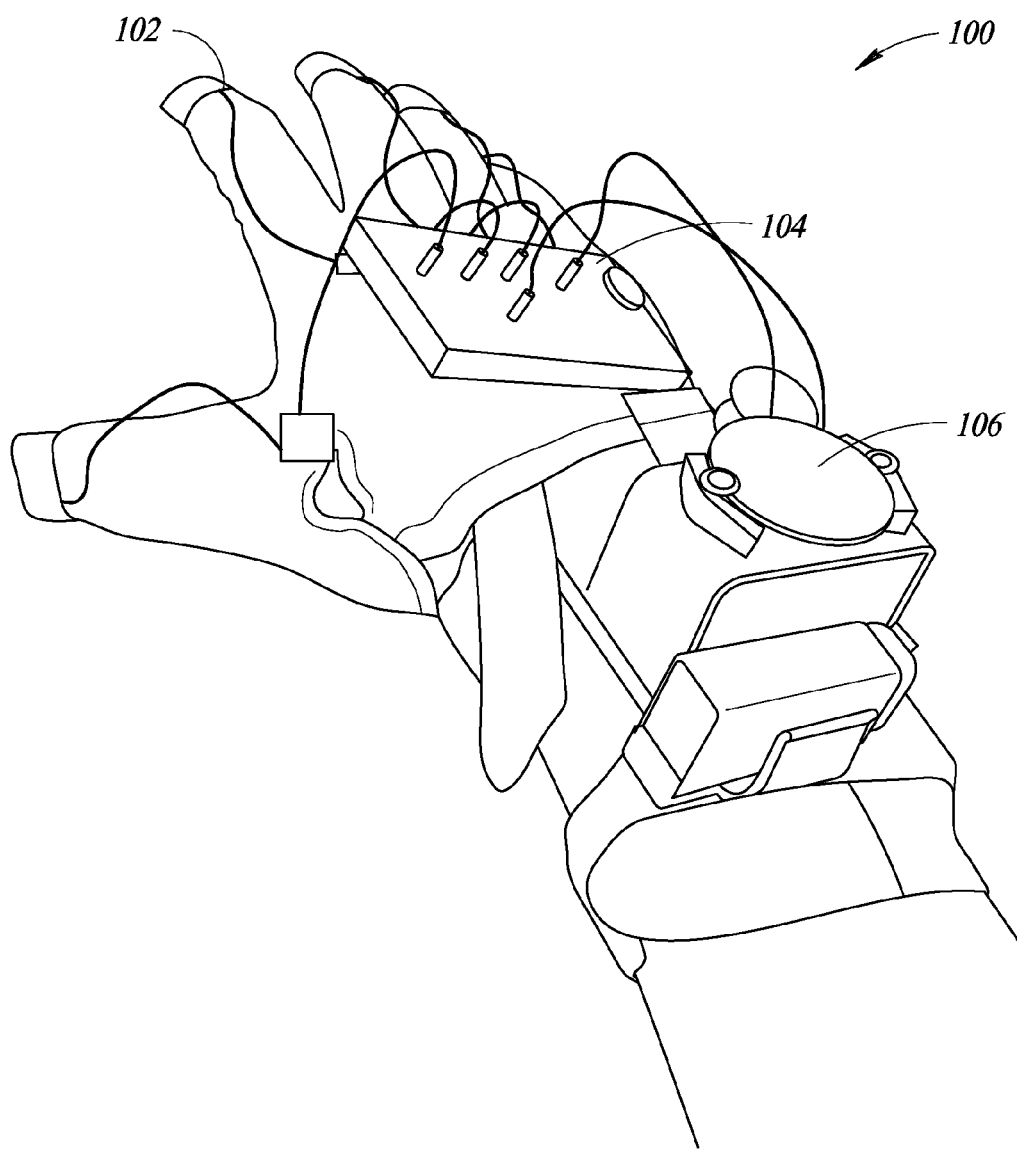
FIG. 1 is a pictorial view of an existing smart glove, according to the prior art.

Turning now to the figures, FIG. 1 shows an example of an existing smart glove 100 for use in a virtual reality application. The existing technology monitors finger motions using fingertip sensors 102 that are wired to a processing unit 104 externally mounted to a top side of the smart glove 100. A MEMs unit 106 containing microelectromechanical sensors is mounted near the wrist joint to sense overall rotational motion of the hand. The MEMs unit 106 may include a gyroscope, for example. The existing smart glove is thick, like a ski glove, and includes bulky components that restrict hand motion and prevent the smart glove 100 from closely conforming to the hand. Furthermore, the number of hand sensors is limited to the fingertip sensors 102. Consequently, complex hand gestures other than those that primarily engage the fingertips cannot be sensed, or at least not accurately sensed, by the smart glove 100.

Figure 2:
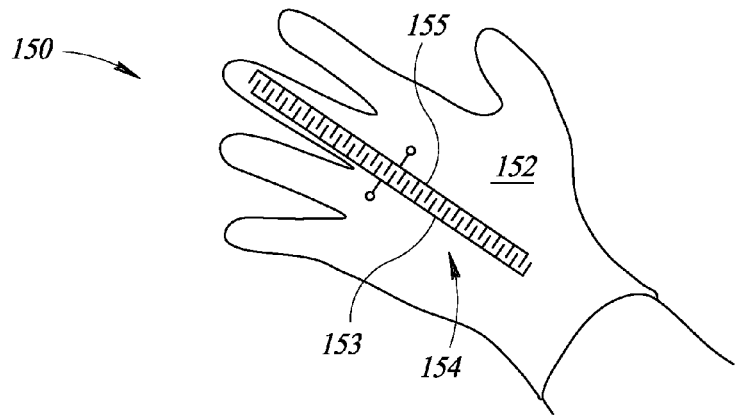
FIG. 2 is a pictorial view of a top side of a flexible smart glove in which a long capacitive micro-sensor is embedded, according to one embodiment described herein.
Figure 3:
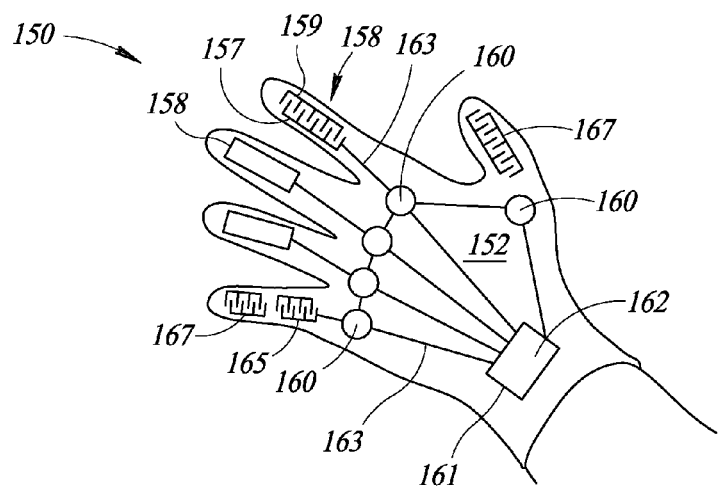
FIG. 3 is a pictorial view of a top side of a flexible smart glove including flexure micro-sensors embedded at some of the finger joints, and coupled to an ASIC, according to one embodiment described herein.
Figure 4:
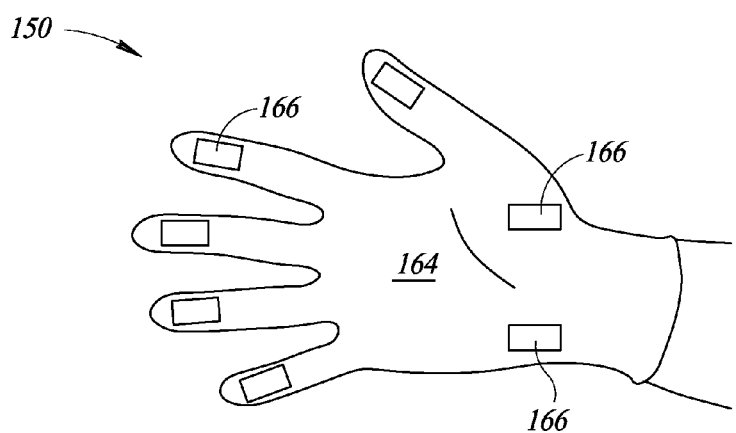
FIG. 4 is a pictorial view of a palm side of a flexible smart glove having embedded pressure micro-sensors, according to one embodiment described herein.

FIGS. 2-4 show embodiments of a thin, flexible smart glove 150 in which flexible electronic micro-sensors are embedded according to the embodiments as taught herein. The flexible smart glove 150 is desirably elastic so that the smart glove material conforms closely to the wearer's hand and permits a full range of hand motion. In FIG. 2, the flexible smart glove 150 is shown as a fingered elastic glove including capacitive flexure micro-sensors 154 on a top side 152 in the form of a long interdigitated comb structure having left and right hand combs 153 and 155, respectively.

For example, the material for the gloves is preferably a very thin polymer, one example of which is latex. The gloves can be surgical quality latex gloves having good strength and also high sensitivity. For example, the thickness of the glove preferably is in the range of 0.1 mm-0.5 mm. Preferably, the thickness is in the range of 0.15 mm-0.3 mm, with a preferred thickness of approximately 0.2 mm. The gloves can be made of other materials besides latex; for example, latex-free gloves made of nitrile, a thin vinyl, or other thin glove. Other examples of material are polyisoprene, neoprene, or other synthetic materials which do not include a natural rubber latex. For such gloves, the thickness may vary at different parts of the glove. For example, the thickness of the fingertip may be in the range of 0.2 mm, while the thickness in the palm might be in the range of 0.18 mm, and near the cuff, 0.17 mm. For gloves of this type, it is common to have slightly different thicknesses at different portions of the glove; for example, slightly thicker material at the union between the finger and the palm portion of the glove, and thin material in the palm and at the section corresponding to the fingerprint, while the very tip of the finger that would cover the nail may be slightly thicker in order to be more durable when it comes into contact with the fingernail. For example, the portion near the fingernail may be in the range of 0.4 mm or thicker, whereas the back of the finger region might be 0.25 mm.

The flexure micro-sensors 154 may extend along one or more of the fingers, along a hand portion, or along the entire length of the flexible smart glove 150 suggested by FIG. 2. A plurality of shorter, compact flexure micro-sensors 158 having left and right hand interdigitated combs 157 and 159, respectively, can be embedded in the smart glove at any or all of 15 different locations corresponding to finger joints, as in the example shown in FIG. 3. For example, the common human hand has fourteen joints in the thumb and fingers, plus various joints in the wrist. Thus, a micro-sensor can be positioned exactly over each of the three joints in each finger, and each of the two joints in each thumb. Thus individual movement of each of the joints of each finger can be reported and sensed. Accordingly, movement of the finger as it flexes with respect to the palm can be sense-independent of movement of the joint at the middle of the finger, which can be sensed and calculated independent of movement from the joint near the tip of the finger. A specific example of this is shown in FIG. 3, in which a micro-sensor 160 is over the joint in which the finger is connected to the palm itself, and then, as shown in FIG. 3 with respect to the little finger, there are two additional micro-sensors 165, 167 positioned over the other two joints in the finger. Alternatively, the two finger joints can be covered by a single sensor 158, an example of which is shown on the index finger. Thus, it is possible to have all fingers have one sensor per joint, as the example shown with respect to the little finger of 165 and 167, or alternatively, that all fingers will have just two sensors, a palm joint sensor 160 and a finger motion sensor 158 or, as a further alternative, it is possible to have different combinations in which some of the fingers have three joint sensors per finger while other fingers have only two or one. In addition to the smart glove 150 being flexible, the micro-sensors themselves are flexible in that they are attached to a flexible substrate material as described below in greater detail. For example, the interdigitated left and right hand combs 157 and 159 move away from and toward one another in response to expansion and contraction of the back of the hand stretching and releasing the elastic glove material. The expansion and contraction motions thus distort the micro-sensors, changing their dimensions and, in turn, altering their electrical properties. Additionally or alternatively, other compact flexure micro-sensor structures 160 can be placed at finger joints, or at the wrist joint 161 to sense localized components of complex hand movements.

FIG. 3 further shows an application-specific integrated circuit (ASIC) 162 embedded in the top side 152 of the flexible smart glove 150. The ASIC 162 receives electrical signals from the micro-sensors and can be programmed to apply electrical signals to the micro-sensors. In one embodiment, sensed electrical signals are transmitted from the micro-sensors to the ASIC 162 via conducting wires 163 embedded in the flexible smart glove 150. The conducting wires 163 can include segments that couple the sensors to one another in a sensor network, as well as segments that couple the sensors directly to the ASIC 162. Alternatively, sensed electrical signals can be transmitted wirelessly to the ASIC according to a non-powered communication method in which a passive RFID tag releases data acquired by the micro-sensors in response to an incident radio signal from the ASIC 162. Alternatively, sensed electrical signals can be transmitted by an active transmitter programmed to send data acquired by the micro-sensors to the ASIC 162 for processing and/or communication to a computing device at a remote destination.

Variations in the received electrical signals indicate hand motions. The ASIC 162 can be programmed further to interpret such signal variations, and correlate certain changes with certain motions. For example, flexing the back of the hand applies lateral forces that tend to stretch the interdigitated combs apart, thus causing fringe capacitances between the left and right combs to decrease. Thus, a decreasing trend in a measured capacitance value may be interpreted by the ASIC 162 as a finger flex or a hand flex, depending on the location of the micro-sensor from which the signal is received.

FIG. 4 shows a palm side 164 of the flexible smart glove 150, in which capacitive pressure micro-sensors 166 are embedded. The pressure micro-sensors 166 can be embedded in the fingertips of the glove, at the base of the thumb, or anywhere that the hand is likely to come into contact with pressure from another object. The capacitive pressure micro-sensors 166 are in the form of parallel plate capacitors in which each capacitor plate is aligned parallel to the glove surface, one plate above the other. Pressure applied to the fingertips or to the palm of the glove compresses the plates of the capacitor, moving them closer to each other for the pressure micro-sensor 166, thus altering their separation distance and, in turn, their electrical properties.

As a further alternative, the micro-sensors at each of the locations shown in FIGS. 2, 3, and 4 may also be combination sensors which include both flexible interdigitated comb capacitive plates and parallel plate capacitors. An example of a single micro-sensor component which has both types of capacitors is shown in the following FIG. 5.

Figure 5:
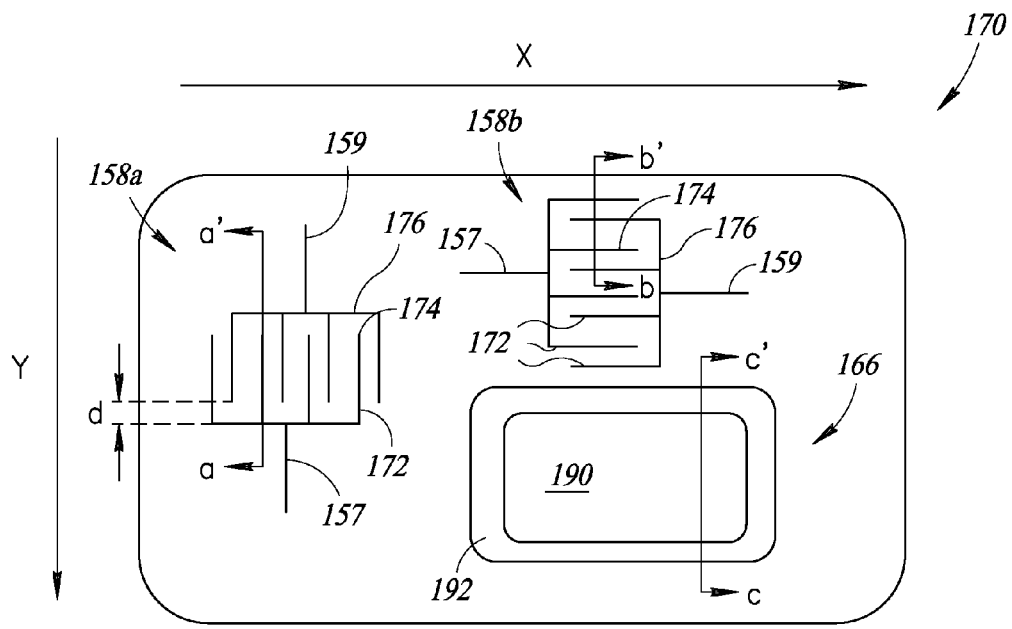
FIG. 5 is a top plan view of an exemplary integrated micro-sensor component layout that includes horizontal and vertical interdigitated combs and a parallel plate capacitor.

FIG. 5 shows magnified views of one exemplary compact micro-sensor structure. FIG. 5 shows a top plan view of a micro-sensor component layout 170. The compact micro-sensor structures shown include a horizontal flexure micro-sensor 158a, a vertical flexure micro-sensor 158b, and a capacitive pressure micro-sensor 166 in the form of a parallel plate capacitor. The vertical and horizontal flexure micro-sensors 158a and 158b sense corresponding horizontal and vertical components of hand motion, respectively, from which a resultant hand motion can be calculated by a microprocessor, e.g., a microprocessor located on board the ASIC 162. The interdigitated left and right hand combs 157, 159 have metallic comb fingers 172 with associated tips 174. As previously indicated, at the locations shown in FIGS. 2 and 3, the individual flexure micro-sensors 158a and 158b can be placed at each location where there is a joint, in order to sense flexure of the joint. Further, the capacitive parallel plate sensor 166 can be positioned as shown in FIG. 4 on the palm side of the hand and fingers. Alternatively, the combination sensor 170 which includes all three individual sensors in single micro-sensor packet can be positioned at each of the locations shown in FIGS. 2, 3, and 4. Thus, the single sensor location can output signals which indicate pressure or compression at the location and the same sensor module 170 will also output flexure in an X-axis or a Y-axis direction. Accordingly, the single sensor 170 is able to sense in the Y direction and the X direction using sensors 158a and 158b, respectively, and in the Z direction using sensor 166. Sensor 170 is a compact sensor which outputs changes in any one of three dimensions at any particular location, and thus is a three-dimensional micro-sensor for hand movements and pressure points at any location in which it is positioned.

The micro-sensor 170 is particularly beneficial because of its small size, having a length in the X direction of in the range of 2 mm or less, and in some embodiments having a length in the X direction of less than 1 mm and a width in the Y direction of less than 1 mm.

Figure 6:
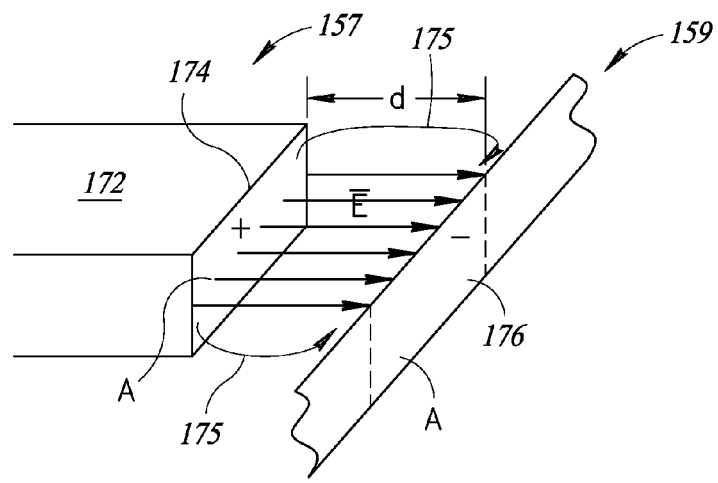
FIG. 6 is a close-up perspective view of an electrical interaction in an interdigitated comb structure as shown in FIG. 5.

FIG. 6 shows a close-up view of the electrical interaction between the left hand and right hand interdigitated combs 157, 159. In particular, electrical properties of the interdigitated combs 157, 159 change as the flexible glove 150 stretches and relaxes in response to hand motions include fringing fields 175 associated with electric charge concentrated at the tips 174. The tip 174 of the left hand comb 157 is shown opposite a nearest portion 176 of the right hand comb 159, along with an intervening electric field that arises when a charge imbalance occurs between opposite combs. The combs can be charged relative to one another by friction associated with hand motion. Additionally or alternatively, the combs can be forced to have a charge differential by applying a voltage to one of the combs via an external power source such as a battery. The electric field is confined to the region of space between the area A of the tip 174 and a corresponding area A within the nearest portion 176. However, the electric field also includes the fringing fields 175 that extend along curved paths outside the boundaries of the tip area of the tip 174.

An associated fringing capacitance makes up a portion of the overall capacitance $C = \in A/d$ between each tip 174 and the nearest portion 176 of the comb directly opposite the tip 174. The capacitance C varies with changes in the overlap of the tip area A and the closest distance d between the tip 174 and the opposite comb. In general, capacitance of a parallel plate capacitor is independent of the charge accumulated on the plates. Therefore, sensing changes in capacitance for purposes of sensing a displacement distance can be done by changing the geometry of the capacitive micro-sensor structures. Changes in the fringing fields 175 around the tips 174 are generally small variations that are more easily detected using a high sensitivity detection device. In one embodiment, the separation between the tip 174 and the nearest portion 176 of the opposite comb, when the flexible glove 150 is in a relaxed state, is desirably less than 1 µm. A target value of about 0.6 µm permits motion of the glove with a high sensitivity to flexure movements.

Figure 7:
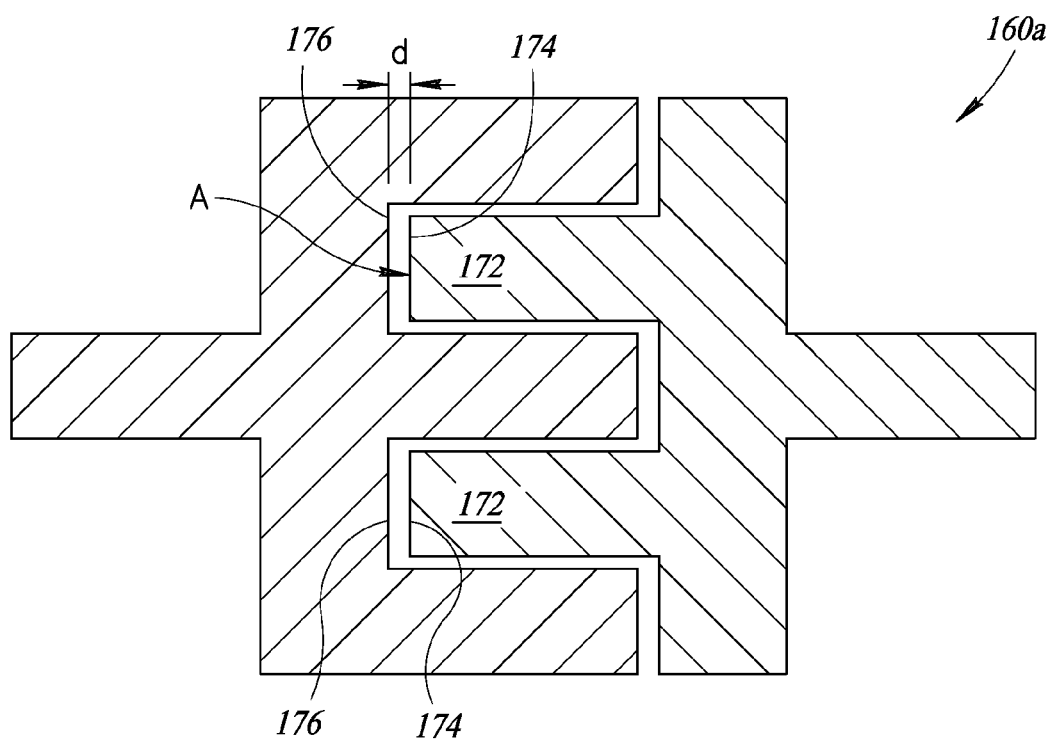
FIG. 7 is a top plan view of a capacitive sensor cell according to one embodiment described herein.
Figure 8:
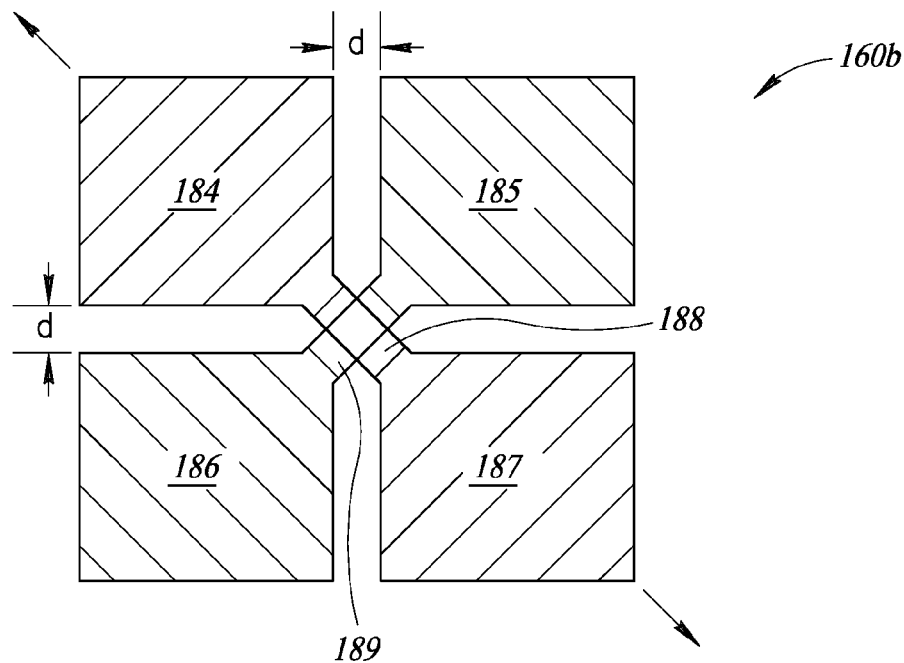
FIG. 8 is a top plan view of an existing capacitive sensor cell that can be incorporated into the flexible smart glove shown in FIG. 3.

FIGS. 7 and 8 show alternative embodiments of the flexure sensors 158. Capacitor design for sensing distances is discussed in further detail in U.S. Pat. No. 6,114,862, assigned to the same assignee as the present patent application, in which various expanding capacitor designs are presented for use as distance sensor cells. Some capacitive cell designs have a higher sensitivity than others, and therefore are suitable for the application as described herein. FIG. 7 shows a first large area capacitive sensor cell 160a in which the comb fingers 172 are made as wide as possible to increase the plate tip area A while decreasing the separation distance d. Maximizing A and minimizing d will tend to increase the starting capacitance C and changes may be easier to sense, with the disadvantage that the distance d will not vary as much. Namely, with the thin comb design as shown in FIG. 5, the overall capacitance is very low because the plate area is low and the distance between the individual plates is relatively high. This has the result that the capacitance of each capacitor 158 is quite low; however, the distance d between the individual plates is thicker than the plates themselves. Therefore the distance d can vary greatly and the changes in capacitance will be much greater because the distance d can vary over a wide range of 2-10 times. On the other hand, the design of FIG. 7 has the distance d between the plates at a low value, at a minimum, to preserve electrical isolation, and the amount of metal in the plates is large so that the area and the overlap is much larger. The result is a much larger capacitive signal. However, because the distance d is already very small, it cannot be made much smaller by flexure of the fingers with respect to each other, nor can it be made much larger. Accordingly, the overall signal itself will be larger but the variations in the signal with flexure will be smaller. Thus, there is a tradeoff between having a larger overall signal but less variation in the magnitude of the signal with flexure of the finger, or having a small signal but a greater variation. Accordingly, the fringing capacitance at the edges of the tips 174 increases so as to magnify the changes that occur when the interdigitated combs separate and relax back to their original position, thus making the changes easier to detect. Although the first large area capacitive sensor cell 160a is more motion-sensitive than the small area combs 157, 159, the first large area capacitive sensor cell 160a may be more likely to become damaged or fail due to the stress of repeated hand motions. Thus, an engineering tradeoff exists between sensitivity and reliability of various comb geometries.

FIG. 8, reproduced from the '862 patent, shows a second large area capacitive sensor cell 160b suitable for use as a finger motion sensor embedded over a finger joint in the flexible smart glove 150. The second large area capacitive sensor cell 160b features four quadrants 184, 185, 186, and 187 arranged in a square. Diagonally opposite quadrants 184 and 187 are connected by a bridge 188; diagonally opposite quadrants 185 and 186 are connected by a bridge 189. As the pairs of connected quadrants 184-187 and 185-186 move relative to one another, the separation distance d between adjacent quadrants, e.g., 184, 186, changes, thus changing the fringing capacitance between the adjacent quadrants 184, 186. The capacitive surface area-to-footprint ratio of the second large area capacitive sensor cell 182 exceeds that of the compact comb structure shown in FIG. 5A, offering a further sensitivity advantage. In a preferred embodiment, the interdigitated capacitive plates are of the type shown in FIG. 8, in which the junction between the bridges 188 and 189 is positioned exactly over the joint itself. It is also possible that the bridge can be removed and each of the four plates be electrically separated from each other, so that the four large plates respond independently to finger or hand motions. Thus, flexure in the joint can be more easily distinguished, since it will bend the large plates 184 and 187 directly away from each other if in one direction, and flexure in the other direction will bend the plates 185 and 186 away from each other.

FIG. 9A, FIG. 9B, and FIG. 10 show cross-sectional views of the various micro-sensors shown in FIG. 5, according to one embodiment. FIGS. 9A, 9B show a cross-sectional view of the pressure micro-sensor 166 intended to be embedded in the palm side 164 of the flexible smart glove 150. The cross section of the pressure micro-sensor 166 is made in the Y-direction, along a cut line c-c'. The pressure micro-sensor 166 includes an upper metal plate 190 and a lower metal plate 192. The metal plates 190 and 192 are separated by a compressible dielectric layer 194 of thickness d, e.g., a layer of polyimide. In one embodiment, the lower metal plate 192 is patterned in a first metal layer while the upper metal plate 190 is patterned in a second metal layer. In response to pressure being applied to the pressure micro-sensor 166, the dielectric layer 194 is compressed, reducing the thickness d, and thus increasing the capacitance proportionally. In one embodiment the thickness d is in the range of about 2-5 μm, the lower metal plate 192 has dimensions 220×220 μm, and the upper metal plate 190 is slightly smaller than the lower metal plate, the upper metal plate 190 having a 200×200 μm area.

FIG. 9A further shows a cross-sectional view of the left hand comb 157 within the horizontal flexure micro-sensor 158a, intended to be embedded in the top side 152 of the flexible smart glove 150. The cross section of the flexure micro-sensor 158a is made in the Y-direction, along a cut line a-a'. The flexure micro-sensor 158a includes the left hand comb 157 and a right hand comb 159, of which only the left hand comb 157 is shown in FIG. 9A. In one embodiment, the left hand comb 157 is patterned as a C-shaped structure formed by coupling a portion of the second metal layer to a portion of the first metal layer. In response to flexion of the surrounding glove material, the left and right hand interdigitated combs, 157 and 159, move apart from one another in the Y-direction, which alters the fringing fields around the tips 174. The C-shaped combs provide twice as many tips 174 and fingers 172, thereby increasing the strength of the fringing fields and, in turn, increasing the sensitivity of the capacitive micro-sensors to detect hand motion.

FIG. 9A further shows a variable serpentine resistor formed in the second metal layer. The variable resistor 195 is made of a metal such as platinum for which resistivity varies with temperature. Thus, if a micro-sensor that includes the variable resistor 195 is embedded on an inside surface of the smart glove 150, the variable resistor 195 senses body temperature of the wearer. If a micro-sensor that includes the resistor 195 is embedded on an outside surface of the smart glove 150, the variable resistor 195 senses ambient temperature. Although the smart glove 150 is thin, it may include an insulating layer to separate inner and outer glove surfaces so as to distinguish the body temperature from the ambient temperature. The variable resistor 195 is in contact with a contact pad 196, which is also coupled to the left hand comb 154.

FIG. 9B shows the parallel plates of capacitor 166, and how they will be responsive to pressure. In particular, there are two plates, upper plate 190 and lower plate 192, separated from each other by a distance d. The plates have an overlap of area A based on the area in which the plates are facing each other. As pressure is applied in the direction shown in FIG. 9B, the plates may be compressed slightly closer to each other, and thus increasing the capacitance value, which can be sensed. The distance 194 between them can thus become smaller or larger as the plates are displaced, relative to each other.

As shown in FIGS. 9A and 9B, the micro-sensors are positioned over the substrate 150, which is the material of the flexible smart glove 150. As previously discussed, this material can be a latex, vinyl, neoprene, nitrile or the like. This material 150 is therefore substantially flexible and permits a wide range of motion of the individual sensors and components of the sensors themselves. Further, the individual sensors are formed in a substrate 201, as explained in more detail later herein.

FIG. 10 shows a cross-sectional view of the vertical flexure sensor 158b, in which the cross-sectional cut is made in the Y-direction along the cut line b-b', through the fingers 172 of the comb, to show the area A relevant to the fringing capacitance at the tip 174.

Figure 11:
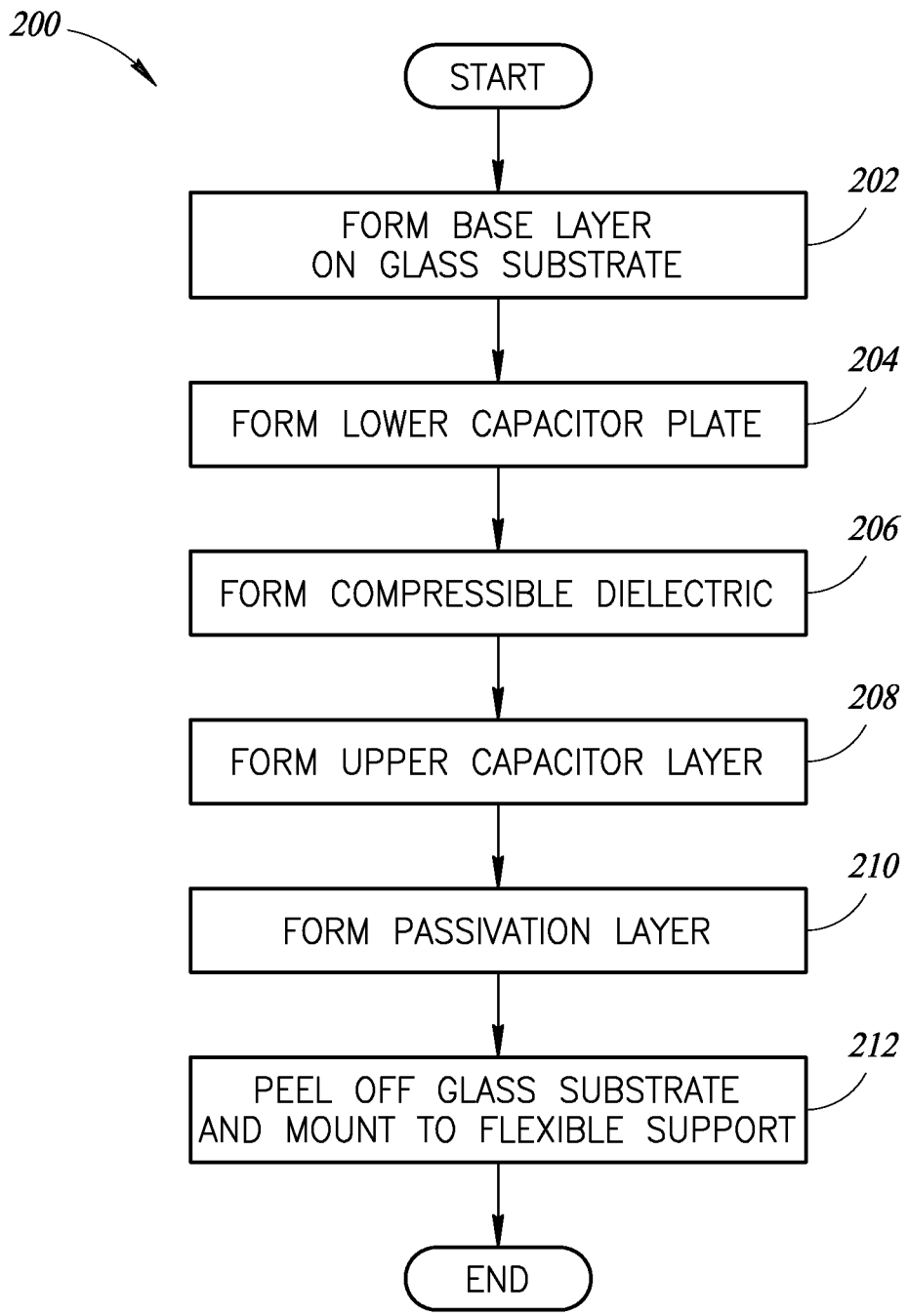
FIG. 11 is a flow diagram showing generalized steps in a method of fabricating micro-sensors suitable for embedding in a flexible smart glove as described herein.

FIG. 11 shows a sequence of steps in a method 200 for fabricating the micro-sensors shown in FIGS. 5 and 9, according to one embodiment. The method 200 is similar in some respects to a fabrication method set forth in U.S. Patent Application Publication No. 2015/0253276, assigned to the assignee of the present patent application, and hereby incorporated by reference in its entirety. For example, the method described below entails forming a polyimide/metal film stack on a carrier used as a temporary support, attaching the film stack to a flexible support, peeling the film stack off the carrier, and then singulating individual sensors. The carrier can be glass, a metal sheet, printed circuit board, or any acceptable low-cost support. Polyimide is a photo-sensitive material that can be patterned optically, similar to patterning a photoresist. Thus, any number of the polyimide layers described below can be patterned using standard methods of optical lithography.

At 202, a base layer 201 of polyimide is formed on a rigid substrate such as, for example, a 500-600 micron thick glass substrate. The rigid substrate (not shown) is desirably formed in the shape of a disc so it can be processed in substantially the same fashion as a semiconductor wafer, but at a much lower cost because glass substrates are much less expensive than silicon substrates. The base layer 201 is desirably in the range of about 10-50 μm thick. The base layer 201 is optically patterned to include step features 205.

At 204, a first metal layer 216 is formed by thin film deposition according to methods well known in the art of semiconductor fabrication. The first metal layer 216 is conformally deposited to cover the step features 205. The lower capacitor plate 192 and a lower portion of the comb 157 are thus formed in the first metal layer 216. The first metal layer is in the range of about 20-30 μm thick and can be made of any suitable conductor, typically Al, Cu, Ag, Pt, Ti, W, or combinations thereof, wherein combinations may be alloys or a multi-metal stack.

At 206, the compressible dielectric layer 194 is formed. In one embodiment, the compressible dielectric layer 194 is also made of a polymer such as polyimide that can be dispensed as a liquid and cured. Thus, the polyimide fills the spaces between the step features 205. The thickness of the compressible dielectric layer 194 is desirably less than 1 μm, with a target of 0.6 μm.

The use of polyimide for the space between the capacitor plates has the advantage that it is a robust material that is flexible which has been widely used and found reliable for supporting and separating conductive leads. It is also compatible with the first layer being made of a polyimide, and the two layers can seamlessly blend with each other. Polyimide, on the other hand, has the feature that it is not as compressible as other materials, and while flexible, it cannot be stretched or expanded as well as many other materials. Accordingly, in some embodiments, it may be desirable to fill the space 194 between the two plates with a different material besides polyimide which has better properties for compression and expansion. For example, a different polymer can be used which includes some latex, rubber, neoprene, or other material which permits a greater variation to take place in the distance between the capacitor plates 190 and 192 if compressed or moved apart from each other. Thus, while polyimide is a preferred material because of its reliability and ease of use in the process, other materials may be used between the plates if greater changes in the distance d are desired.

At 208, after curing the dielectric layer, a second layer of metal 218 is deposited, patterned, and cured to form the serpentine resistor 195 and step features 207. The second metal layer can be formed by thin film deposition. The upper metal plate 190 and a portion of the left hand comb 157 are patterned in the second metal layer. The second metal layer has similar characteristics to the first metal layer. The second metal layer can include, as a first step in the deposition, depositing the serpentine resistor 195 as a conformal layer over the patterned dielectric layer 194, followed by a second conformal deposition step in which the upper metal plate 190, the lower portion of the left hand comb 157, and the contact pad 196 are formed. The serpentine resistor 195 is desirably about 10 μm thick in the Z-direction and up to 200 μm long in the Y-direction. The serpentine resistor 195, being coupled to the contact pad 196, is in thermal equilibrium with the ambient environment so that its resistance varies accordingly with the ambient temperature, or with a wearer's body temperature, when the contact pad 196 is in close proximity to the wearer's skin.

At 210, a passivation layer 207 is formed by conformally depositing another layer of polyimide. The passivation layer 207 serves as a protective layer covering the micro-sensors. Openings in the passivation layer 207 allow accessing the contact pads 196 to acquire electrical signals from the micro-sensors. The polyimide/metal film stack thus formed contains no vias between the first and second metal layers. Instead, via-less metal-to-metal contacts are formed by, for example, the step features 205.

At 212, the polyimide/metal film stack is peeled off the substrate and mounted to a flexible support 150, effectively replacing the rigid substrate with the flexible support 150. The flexible support 150 has a thickness in the range of about 50-200 μm.

As previously stated, the flexible support 150 can be the actual rubber glove itself, which has a thickness previously described. Alternatively, the completed micro-sensor 170 can be placed on an intermediate flexible substrate; for example, a very thin flexible layer having the thickness of 25-50 microns, which is then attached to a flexible glove as the type previously described herein. The traces 163 which electrically connect the capacitive sensors to each other and to the microprocessor 161 can be provided in the same polyimide layers of the first metal layer 216, or the second metal layer 218, or yet a third layer which is connected to a separate flexible support besides the gloves 150. For robust connectiveness, it may be desired to have the traces 163 composed of both the first metal layer 216 and the second metal layer 218 so that if either one is electrically connected, then solid connection is provided.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:
    a fingered conformal glove fittable to a human hand, the conformal glove having a palm side and a top side that are made of a thin elastic material that permits a full range of motion of the hand;
    a plurality of capacitive micro-sensors embedded in the conformal glove at locations corresponding to finger joints, the capacitive micro-sensors including:
        a plurality of pressure micro-sensors embedded in the palm side, each pressure micro-sensor having a first metal plate and a second metal plate separated by a layer of a compressible dielectric material, and a plurality of flexure micro-sensors embedded in the top side, a first set of the plurality of flexure micro-sensors having interdigitated combs extending in a first direction and a second set of the plurality of flexure micro-sensors having interdigitated combs extending in a second direction, the second direction being perpendicular to the first direction, each of the plurality of capacitive micro-sensors being mounted to a respective flexible substrate;

a wireless transmitter configured to communicate to a remote destination hand motion data acquired by the capacitive micro-sensors; and conducting wires coupling the capacitive micro-sensors to the wireless transmitter.

2. The apparatus of claim 1, further comprising resistive temperature micro-sensors adjacent to at least some of the capacitive micro-sensors.

3. The apparatus of claim 1 wherein a thickness of the elastic material is less than 2 mm.

4. The apparatus of claim 1 wherein the compressible dielectric material is polyimide.

5. The apparatus of claim 1, further comprising a capacitive micro-sensor embedded in the glove at a location corresponding to a wrist joint.

6. The apparatus of claim 1, wherein the wireless transmitter is a passive RFID transmitter that transmits the hand motion data acquired by the micro-sensors in response to an incident radio signal.

7. The apparatus of claim 1, wherein the wireless transmitter is an active transmitter programmed to transmit the hand motion data acquired by the micro-sensors to a remote computing device.

8. A user-wearable garment comprising:
an elastic material, and
an embedded microelectronic sensor device, including
a flexible substrate;
a parallel plate capacitor formed on top of the flexible substrate, the parallel plate capacitor including a first metal plate formed in a first metal layer and a second metal plate formed in a second metal layer, the first and second metal plates separated by a layer of compressible dielectric material;
a resistor in contact with one of the metal layers;
an interdigitated capacitor formed in at least one of the metal layers;
contact pads coupled to the capacitors and to the resistor, the contact pads permitting acquisition of electrical signals from the microelectronic sensor device; and
a protective layer.

9. The garment of claim 8 wherein the interdigitated capacitor has a fringe capacitance that varies with lateral applied forces.

10. The garment of claim 8 wherein the parallel plate capacitor has a capacitance that varies with pressure applied to either one or both of the upper and lower metal lines.

11. The garment of claim 8 wherein the upper and lower metal lines are coupled to the contact pads by a direct metal-to-metal interconnect that does not include vias.

12. The garment of claim 8 wherein the flexible substrate, the compressible dielectric material, and the protective layer are all made of polyimide.

13. The garment of claim 8 wherein the resistor is a metal serpentine resistor having a resistance that varies with temperature.

14. A method of making wearable electronic sensor components, the method comprising:
forming a base layer of polyimide on a rigid substrate;
forming a lower capacitor plate layer on the base layer of polyimide;
forming a compressible dielectric layer on the lower capacitor plate layer;
depositing an upper capacitor plate layer on a top of the compressible dielectric layer;
depositing a passivation layer on the top of the upper capacitor plate layer; and
replacing the rigid substrate with a flexible support.

15. The method of claim 14, further comprising a metallic resistor in contact with one of the capacitor plate layers, the metallic resistor suitable for use as a temperature sensor.

16. The method of claim 14 wherein the metallic resistor is a serpentine structure made of platinum.

17. The method of claim 14 wherein the replacing entails peeling the layers away from the rigid substrate and mounting the layers onto the flexible support.

18. The method of claim 14 wherein the flexible support is made of polyimide.

19. The method of claim 14 wherein the passivation layer is made of polyimide.

20. The method of claim 14 wherein the rigid substrate is made of glass.

* * * * *